United States Patent
Seever et al.

(10) Patent No.: US 11,240,225 B1
(45) Date of Patent: Feb. 1, 2022

(54) SINGLE SIGN-ON TECHNIQUES

(71) Applicant: Amazon Technologies, Inc., Seattle, WA (US)

(72) Inventors: Adam Seever, Wimberley, TX (US); Anantharam Vaidyanathan, Pflugerville, TX (US); Jean-Pierre Duplessis, Madrid (ES); James Joseph Lawrence, Austin, TX (US); Anthony Russell Giardino, Cedar Park, TX (US); Ritu Gupta, Austin, TX (US); Jean Tui Popenoe, Austin, TX (US); Diego Oliveros, Pflugerville, TX (US); Puneet Bansal, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 132 days.

(21) Appl. No.: 16/808,031

(22) Filed: Mar. 3, 2020

(51) Int. Cl.
  *H04L 29/06* (2006.01)
(52) U.S. Cl.
  CPC .............................. *H04L 63/0815* (2013.01)
(58) Field of Classification Search
  CPC .................................................. H04L 63/0815
  See application file for complete search history.

(56) References Cited

U.S. PATENT DOCUMENTS

| | | | | |
|---|---|---|---|---|
| 2014/0223532 A1* | 8/2014 | Satoh | .................. | H04L 63/0815 726/7 |
| 2015/0200924 A1* | 7/2015 | Parla | ....................... | H04L 63/04 726/7 |
| 2017/0109534 A1* | 4/2017 | Compagna | .......... | H04L 63/1408 |
| 2017/0180351 A1* | 6/2017 | Lu | ......................... | H04L 67/146 |
| 2020/0106766 A1* | 4/2020 | Suraparaju | ............ | H04L 9/3226 |
| 2021/0037011 A1* | 2/2021 | Kelley | ................ | H04L 63/0823 |

* cited by examiner

*Primary Examiner* — Henry Tsang
(74) *Attorney, Agent, or Firm* — Kilpatrick Townsend & Stockton LLP

(57) ABSTRACT

Systems and methods are described herein for providing single sign-on capabilities. In some embodiments, an intermediate endpoint of a service provider receives, from a user device, an http_post message including security data provided by an identity provider. In some embodiments, the intermediate endpoint retrieves relay state data specific to the identity provider and transmits the security data and the relay state data to the user device. The user device then transmits the security data and relay state data to an authentication endpoint of the service provider. The authentication endpoint verifies that the SAML response indicated the user was authenticated by an identity provider. A URL may be retrieved from the relay state data and the user device's web browser is redirected to the URL to provide access to one or more services of the service provider.

20 Claims, 8 Drawing Sheets

SINGLE SIGN-ON TECHNIQUES

BACKGROUND

It has become commonplace for users to initiate a single sign-on (SSO) session via a service provider. However, some users may desire to initiate an SSO session from their identity provider (IDP). An identity provider is a system entity that creates, maintains, and manages identity information while providing authentication services within a federation or distributed network. Users cannot directly initiate an SSO session from their identity provider without using an SSO uniform resource locator (URL) provided them by the service provider. Some IDPs do not and/or will not support this functionality. In some cases, users have to navigate to the service provider's SSO URL outside of their IDP applications page. In some cases, users may not have access to this link while inside their IDP application. A user may not be able to initiate a SSO session from their IDP which can lead to frustration and delay for the user. Embodiments of the invention discussed herein address these and other problems, individually and collectively.

BRIEF DESCRIPTION OF THE DRAWINGS

Various embodiments in accordance with the present disclosure will be described with reference to the drawings, in which.

DETAILED DESCRIPTION

Figure 1:
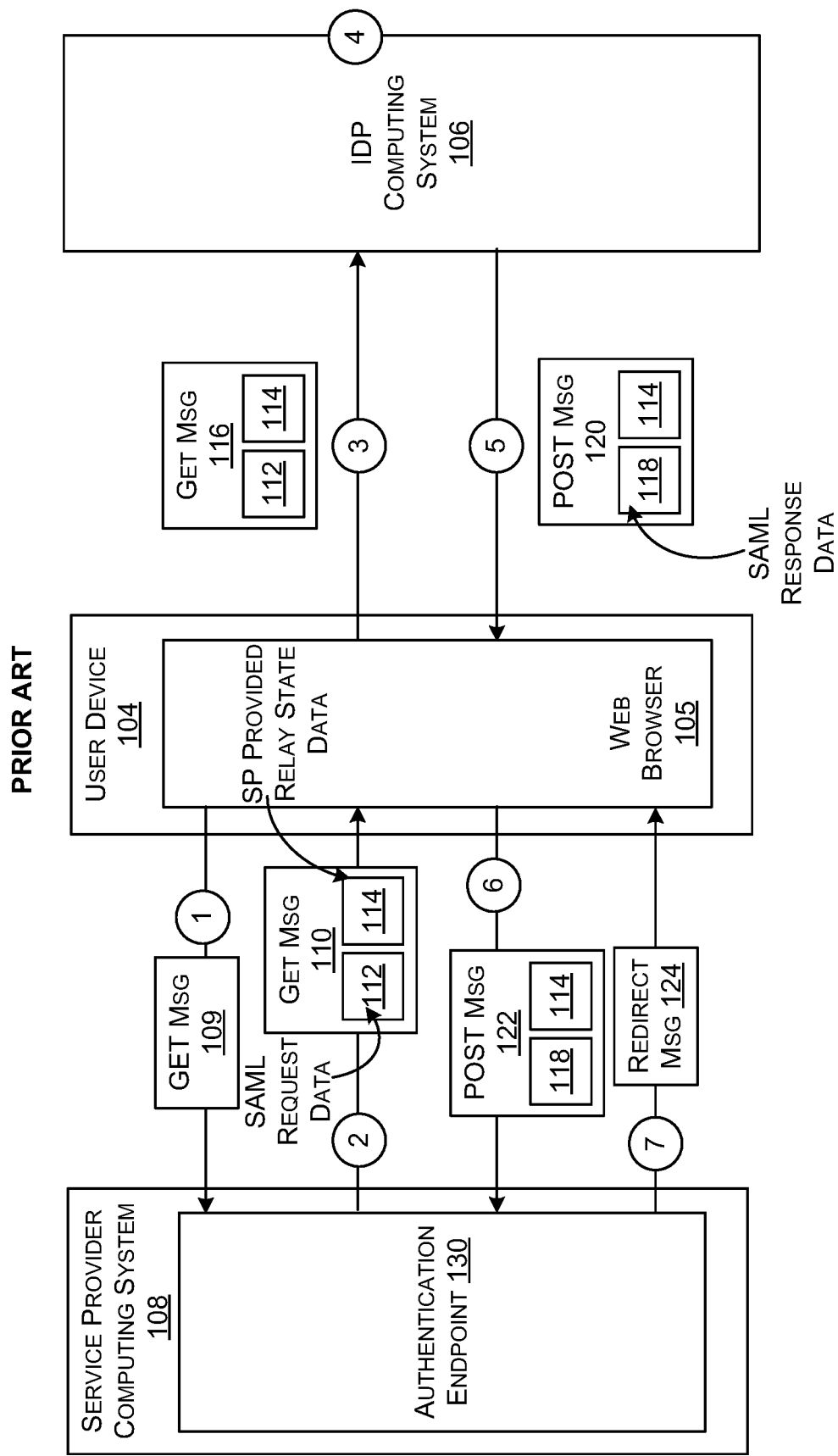
FIG. 1 illustrates a conventional protocol for providing a single sign-on capability when initiating the a single-sign on request via an interface of a service provider computing system, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to a single sign-on engine that may be utilized to enable a user to access multiple services (e.g., from different providers) using a single set of user credentials. A "service provider" may be any suitable system that provides access to one or more services and/or resources (e.g., electronic services and/or physical/electronic resources) such as an online marketplace, an electronic news provider, an electronic music service, and the like. An "identity provider" (IDP) may be a system entity that creates, maintains, and manages identity information while providing authentication services (e.g., to the service provider) within a federation or distributed network. As used herein, data corresponding to a Security Assertion Markup Language (SAML) may be generally referred to as "security data." Security data may include any suitable data of a SAML request and/or a SAML response as defined by a SAML standard. A "computing system," as used herein, may include one or more computers including a distributed computing system including a plurality of computers.

Conventionally, users may utilize an interface provided by their IDP (e.g., a website, a software application, etc.) to interact with services provided by the service providers. By way of example, a user may select an option (e.g., a button) via procurement software of the IDP to access an electronic online catalog of a service provider. When the option is selected, a single sign-on request may be initiated and the user may be directed to a website (or an application) associated with the service provider. While it may be desirable to access the service provider services in this manner, a the single sign-on request will fail because the single sign-on request provided by the IDP does not have all of the data required by the service provider to initiate a SSO session. Instead, the user may be required to access a predefined SSO URL (e.g., via their web browser, or a manually embedded link, etc.) provided by the service provider to initiate the session. This can cause frustration and delay for the user. Additionally, conventional systems may utilize http_get (e.g., a GET message according to http standard RFC 7231) or redirect binding, which restrict a SSO redirect URL to 2500 characters. This may create a problem for users with internal security settings and/or customers who utilize certain browser versions (e.g., Internet Explorer 10). The techniques discussed herein are directed to providing IDP-initiated SSO in order to enable users to authenticate with and/or utilize service provider applications from within their IDP.

In some embodiments, a Security Assertion Markup Language (SAML) standard is utilized to pass credentials between a service provider and an identity provider. SAML implements a secure method of passing user authentications and authorizations between the IDP and the service provider. When a user logs into a SAML enabled application hosted by the service provider, the service provider requests authorization (e.g., via a message that includes SAML request data, also referred to as "a SAML request") from the appropriate identity provider. The identity provider authenticates the user's credentials and then returns an authorization (e.g., via a message that includes SAML response, also referred to as "a SAML response") for the user to the service provider, and the user would thereafter be able to access the service provider's services (e.g., an online electronic catalog, etc.).

In some embodiments, the service provider may be configured to require parameters of a relay state (e.g., relay state data) in order to allow access to the service provider's services. When a user initiates a SSO session from the service provider, the service provider has access to these parameters and can pass them in a SAML request to the identity provider. The identity provider processes the SAML request and copies the relay state data to a SAML response which is then transmitted back to the service provider. Because the relay state data is provided with the SAML response, the service provider can redirect the user to a predefined landing page provided in the relay state data when the SAML response indicates the user has been authenticated.

Conventionally, when the user attempts to initiate an SSO session from the IDP, the IDP does not have access to the appropriate relay state data (or any relay state data). In this case, the IDP sends a message including SAML response data to the service provider indicating the user has been authenticated, but because the service provider requires a relay state data that is lacking from the message, the SSO session will not be established. Additionally, previous systems may utilize an http_redirect (e.g., any suitable response message of http standard RFC 7231 having a status code indication redirection) to pass a SAML request/response data in the URL parameters. This can be problematic as the URL parameters of a http_redirect may be limited, which in turn can cause the SAML request/response data to be truncated and the SSO to fail.

Techniques herein may utilize an intermediate endpoint of the service provider (or any suitable module of the service provider or any suitable intermediate communication endpoint) to intercept a message including a SAML response from an IDP, retrieve an appropriate relay state data associated with the IDP (e.g., a relay state that is unique and specific to the IDP, relay state data that is associated with the identity provider identifier of the IDP, etc.), and inserts—the retrieved relay state data with the SAML response such that the user's SSO session can be established even though it was initiated via the IDP and not the service provider. In some embodiments, the message that originated from the IDP may be routed through the intermediate endpoint based at least in part on determining that the message does not include relay state data. These techniques enable functionality that was not previously available and can reduce the frustration and delay experienced by a user when attempting SSO. Additionally, the problem of truncated SAML data can be resolved by encapsulating the SAML requests and responses within the HTML body of an http_post message (e.g., a POST message according to http standard RFC 7231) as the HTML body of an http_post message is not limited in the same manner as the http_redirect message.

FIG. 1 illustrates a conventional protocol 100 for providing a single sign-on capability when initiating the a single-sign on request via an interface of a service provider computing system, in accordance with at least one embodiment. In the embodiment depicted in FIG. 1, the user may attempt a SSO via a SSO URL provided by the service provider.

The protocol begins at operation 1, where the user device 104 is utilized to request a SSO URL associated with the service provider. By way of example, the user may utilize a web browser executing at the user device 104 to transmit a http_get message 109 to request the data associated with the SSO URL. The user can select an option provided via an interface rendered at the web browser 105 (e.g., via a uniform resource locator (URL) associated with initiating a single sign-on) to request a single sign-on to cause the web browser 105 to transmit the http_get message 109 to the service provider computing system 108. By way of example, in some embodiments a user selects a button (or another suitable interface element) via a webpage provided by the service provider to login using the IDP. In other embodiments, the user selects a link (e.g., a hyperlink to a URL associated with initiating a single sign-on) via an email message to launch the web browser 105, which in turn transmits the http_get message 109 for the URL. In some embodiments, the URL provided for initiating a single sign-on is unique for an entity with which the user is associated (e.g., an IDP, etc.). The specific triggering event for transmitting an http_get message 109 may vary. It should be appreciated that the functionality provided by the web browser 105 can similarly be provided by another application executing at the user device 104. The http_get message 109 may be received by the authentication endpoint 130. In some embodiments, the authentication endpoint 130 may be a component of the service provider computing system 108 and configured to provide authentication capabilities for the service provider.

At operation 2, the service provider computing system 108 responds to the http_get message from operation 1 with http_get message 110 that is transmitted to the user device 104. The http_get message 110 includes SAML request data 112 and relay state data provided by the service provider (e.g., SP-provided relay state 114). The SAML request data 112 and the SP-provided relay state 114 may be specific to the entity. The authentication endpoint 130 retrieves the identity of the IDP computing system 106, the SAML request data 112, and/or the SP-provided relay state 114 for insertion into the http_get message 110 based at least in part on the URL requested via the http_get message 109 (e.g., a URL specific to the entity). It should be appreciated that the authentication endpoint 130 may store (or access) any suitable number of relay state data corresponding to any suitable number of IDPs. In some embodiments, the http_get message 109 may include an identifier for the IDP (e.g., the requested URL from which the IDP may be identified). An identifier for an IDP may be referred to as an "identity provider identifier" and may include any suitable alphanumeric identifier of any suitable length that is uniquely associated with an identity provider. The authentication endpoint 130 may utilize this identifier (e.g., the URL requested that may be specific to the IDP) to retrieve the relay state data corresponding to the IDP. A non-limiting example of the SP-provided relay state is provided below.

> https%3A%2F%2Fdevelopment.serviceproviderA.
> com%2Fmn%2Fap%2Fsignin%3Fopenid.pape.
> max_auth_age%3D0%26openid.return_to%3D-
> https%253A%252F%252Fdevelopment.service-
> providerA.com%26openid.assoc_handle%3DusS-
> ervicepProviderA%26pageId%3Dauthportal_b2b_
> login_us%26identityProvider%3D7364dda9443a4-
> c2b8a95d679b1b237a1%26openid.identity%3Dhttp-
> %253A%252F%252Fspecs.openid.net%252Fauth%-
> 252F2.0%252Fidentifier_select%26openid.claimed_
> id%3Dhttp%253A%252F%252Fspecs.openid.net%-
> 252Fauth%252F2.0%252Fidentifier_select%26openi-
> d.mode%3Dcheckid_setup%26openid.ns%3Dhttp%
> 253A%252F%252Fspecs.openid.net%252Fauth%25-
> 2F2.0%26_encoding%3DUTF8%26ref_%3Db2b_ea-
> m_cba%26relyingParty% ServiceProviderA In some embodiments, relay state data may include any suitable number of parameters. The service provider computing system 108 may require the relay state data to allow a SSO session. In some embodiments, the parameters may include, but are not limited to:

identityProvider ID (e.g., 7364dda9443a4c2b8a95d679b1b237a1)—this parameter may be used to identify a configuration that can be used to parse a SAML response and direct the user to the correct account openid.ns (e.g., http://specs.openid.net/auth/2.0)—this parameter may be required for the request to be a valid OpenID Authentication 2.0 request openid.mode (e.g., checkid_setup)—this parameter may be used to inform an authentication endpoint (not depicted) of the service provider computing system 108 what kind of message it is processing. In the case of checkid_setup, a sign-in request is indicated.

openid.assoc_handle (e.g., usservice providerA_—this parameter can be used to specify signature details, required for the authentication endpoint of the service provider openid.return_to (e.g., https://development.serviceproviderA.com)—this parameter may be used to redirect the user to a particular URL (e.g., a landing page) after authentication is complete openid.identity (e.g., http://specs.openid.net/auth/2.0/identifier_select)—this parameter can be required to be set in order to be compliant with an OpenID protocol openid.claimed_id (e.g., http://specs.openid.net/auth/2.0/identifier_select)—this parameter may be required to be set in order to be compliant with OpenID protocol openid.pape.max_auth_age (e.g., 0)—this parameter may be used to set an authentication timeout to a default value pageId (e.g., authportal_b2b_login_us)—this parameter may be used to specify a UI customization for the service provider login _encoding (e.g., "UTF8")—this parameter may be used to specify a character encoding ref_ (e.g., "b2b_eam_cba")—this parameter may be used to track metrics on SSO usage relyingParty (e.g., service provider A)—this parameter may be used to specify the relying party At operation 3, the user device 104 (e.g., the web browser operating at the user device 104) transmits the SAML request data 112 and the relay state data 114 in an http_get message 116 to the IDP computing system 106. In response to receiving the http_get message, the IDP computing system 106 obtains user credentials from the user and authenticate the user with those credentials. The IDP computing system 106 may then generate SAML response data 118 indicating that the user was authenticated (or not).

At operation 4, the IDP computing system 106 attempts to authenticate the user. In some embodiments, the IDP computing system 106 provides an interface through which the user may enter their credentials (e.g., username, password, PIN, etc.). Upon receiving these credentials (e.g., from the web browser 105), the IDP computing system 106 performs any suitable operations to authenticate the user against previously stored information. By way of example, the IDP computing system 106 identifies whether the user credentials provided by the user match those stored in memory. If there is a match, the IDP computing system 106 continues to operation 5. In some embodiments, if the credentials provided do not match the previously stored credentials, the IDP computing system 106 determines the user is not authentic and transmits an indication of the same to the web browser 105 for display. In some embodiments, if the user is not authenticated, the protocol 100 ends. Alternatively, the user may have been previously authenticated, and the IDP computing system 106 recognizes the previous authentication (e.g., via cryptographic token presented by the user's web browser 105 and/or device 104) and progresses to operation 5.

At operation 5, the IDP computing system 106 transmits http_post message 120 to the user device 104. The http_post message 120 includes the SAML response data 118 generated by the IDP computing system 106 as well as the relay state data 114 received at operation 3.

At operation 6, the user device 104 (e.g., the web browser operating at the user device 104) transmits the SAML response data 118 and the relay state data 114 in an http_post message 122 to the service provider computing system 108. In some embodiments, the SAML response data 118 may indicate that the user has been authenticated.

At operation 7, the service provider computing system 108 may process the relay state data 114. By way of example, an identifier associated with the IDP is retrieved from the relay state data and utilized to retrieve a configuration that is used to parse the SAML response data 118. The configuration may then be used to parse the SAML response data 118 to identify that the user was authenticated. If the user was authenticated, the service provider computing system 108 may process one or more parameters of the relay state data 114 (e.g., openid.return_to) to identify a URL (e.g., a landing page) to which the user is to be redirected. The service provider computing system 108 then sends an http_redirect message 124 to redirect the web browser of the user device 104 to the URL retrieved from the relay state data 114. In this manner, the user gains access to the services provided by the service provider via authentication provided by the IDP.

Figure 2:
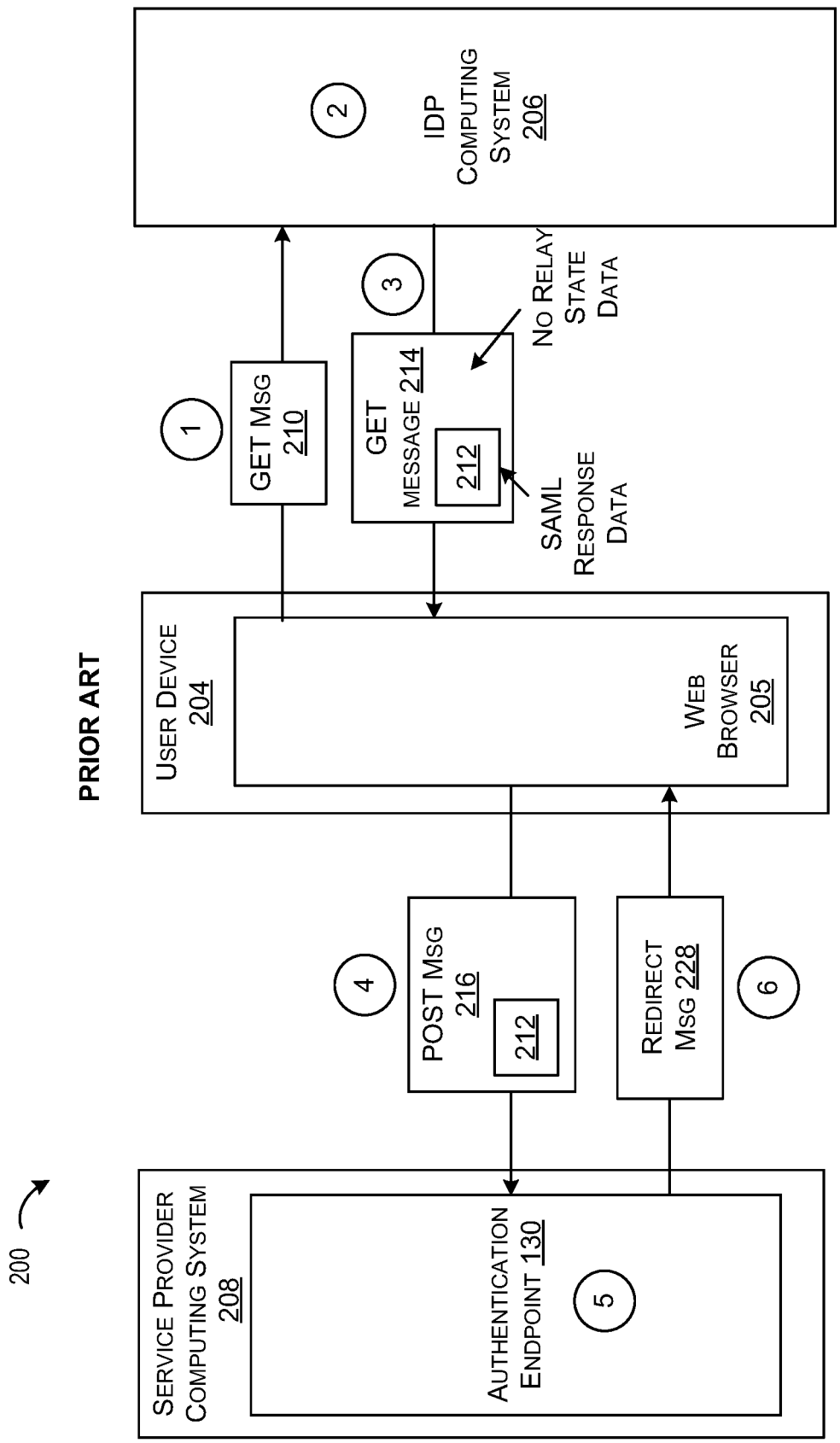
FIG. 2 illustrates a previously unsolved problem with providing a single sign-on capability when initiating a single sign-on request via an interface of an identity provider computing system.

FIG. 2 illustrates a previously unsolved problem with providing a single sign-on capability when initiating a single sign-on from an interface of an identity provider computing system. The protocol 200 may begin at operation 1, where the user attempts initiating a SSO via the IDP computing system 206 (e.g., an example of the IDP computing system 106 of FIG. 1). By way of example, the IDP computing system 206 may provide an interface for initiating a single sign-on through the identity provider. As a non-limiting example, the IDP computing system 206 may provide an interface (e.g., procurement software, a webpage, etc.) from which a user (e.g., an employee of a company) can interact with a service provider (e.g., order office supplies from an electronic online catalog). The interface may be configured to include an option (e.g., a button, a drop down item of a menu, etc.) and/or hyperlink that is associated with the service provider. Selection of the option and/or hyperlink initiates a single sign-on process discussed at operations 2-5.

At operation 2, the IDP computing system 206 attempts to authenticate the user. In some embodiments, the IDP computing system 206 may provide an interface (e.g., a pop up window, a webpage, etc.) through which the user may enter their credentials (e.g., username, password, PIN, etc.). For example, in some embodiments the IDP computing system 206 redirects the user to a particular webpage for providing their credentials (not depicted). Upon receiving these credentials (e.g., from the web browser 205), the IDP computing system 206 performs any suitable operations to authenticate the user against previously stored information. By way of example, the IDP computing system 206 identifies whether the user credentials provided by the user match those stored in memory. If there is a match, the IDP computing system 206 continues to operation 3. In some embodiments, if the credentials provided do not match the previously stored credentials, the IDP computing system 206 determines the user is not authentic and transmits an indication of the same to the web browser 205 for display. In some embodiments, if the user is not authenticated, the protocol 200 ends. Alternatively, if the user may has been previously authenticated, the IDP computing system 106 recognizes the previous authentication (e.g., via cryptographic token presented by the user's web browser 105 and/or device 104) and progresses to operation 5.

At operation 3, the identity provider computing system 206 generates SAML response data (e.g., SAML response data 212). The SAML response data 212 may be included in a http_get message 214 transmitted in response to the http_get message 210. As will be appreciated by one of skill in the art, the http_get message 214 does not include relay state data because, for example, the IDP computing system 206 cannot generate or provide suitable relay state data. In some embodiments, the http_get message 214 includes a URL specific to the IDP.

At operation 4, in response to receive http_get message 214, the web browser 205 generates a single sign-on request message. The single sign-on request message is in the form of a http_post message (e.g., http_post message 216). Service provider computing system 208 may be an example of the service provider computing system 108 of FIG. 1. In some embodiments, http_post message 216 includes the SAML response data 212 generated by the IDP computing system 206. In some embodiments, SAML response data 212 may include an identifier for the IDP. In some embodiments, the http_post message 216 includes a URL specific to the IDP. In some embodiments, the URL requested is a unique identifier of the IDP.

At operation 5, the authentication endpoint 226 obtains an identifier (e.g., the URL of the http_post message 216) to identify a configuration with which the SAML response data 212 may be parsed. Once parsed, the SAML response data 212 is utilized to verify that the user was authenticated. The service provider computing system 208 checks the http_post message 216 for relay state data. However, in the example provided in FIG. 2, the http_post message 216 does not include such data. Because there is no relay state data in the http_post message 216, the authentication endpoint 226 denies the user access to service provider services. In some embodiments, the service provider computing system 208 sends an http_redirect message 228 at operation 6 redirecting the web browser 205 to a default URL indicating the sign on was unsuccessful. In some embodiments, the protocol 200 halts after the determination is made that the user was not authenticated at operation 5. Any suitable data may be transmitted at operation 6 to indicate (e.g., at the user device 204) that the single sign-on attempt was unsuccessful. The authentication endpoint 226 checks for relay state data upon receiving the http_post message 216, or at any suitable time (e.g., prior to obtaining and/or processing the SAML response data 212), and if the relay state data is not included in the http_post message 216, the authentication endpoint 226 denies the user access to the services of the service provider.

Thus, because the IDP computing system 206 does not have access to relay state data, the single sign-on cannot be successful using the conventional system.

Figure 3:
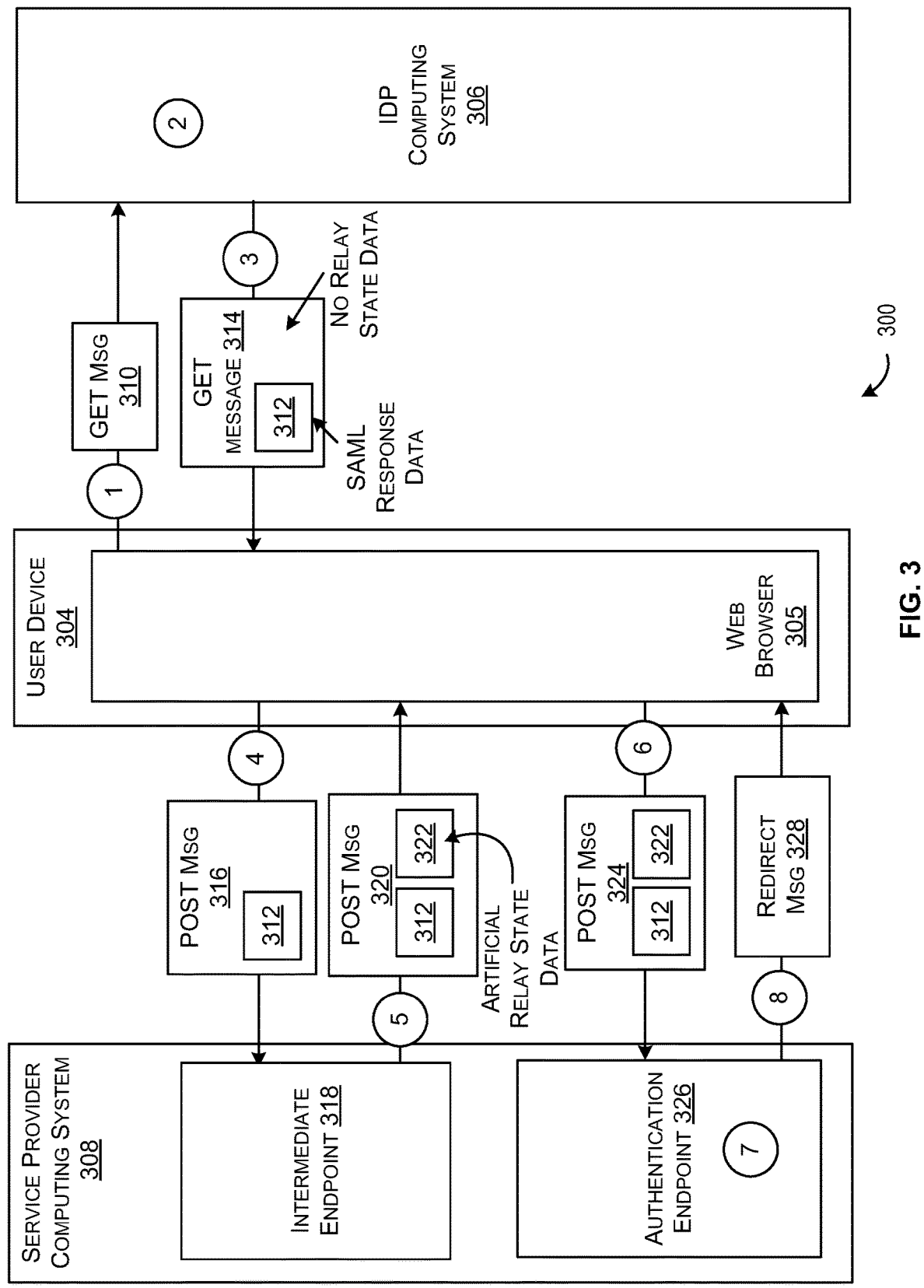
FIG. 3 illustrates an example protocol for providing a single sign-on capability when initiating the single sign-on via an interface of an identity provider computing system utilizing a single sign-on engine, in accordance with at least one embodiment.

FIG. 3 illustrates an example protocol 300 for providing a single sign-on capability when initiating the single sign-on via an interface of an identity provider computing system utilizing a single sign-on engine, in accordance with at least one embodiment. One or more portions of the single sign-on engine can execute, in whole, or in part, at any suitable combination of a user device 304 (e.g., an example of the user device 104 of FIG. 1), an identity provider (IDP) computing system 306 (e.g., an example of the IDP computing system 106 of FIG. 1), and/or a service provider computing system 308 (e.g., an example of the service provider computing system 108 of FIG. 1).

The protocol 300 may begin at operation 1, where the user attempts initiating a SSO via the IDP computing system 306 (e.g., an example of the IDP computing system 106 of FIG. 1). By way of example, in some embodiments the IDP computing system 306 provides an interface for initiating a single sign-on through the identity provider. For example, a user selects a button associated with the service provider from within their company's procurement software (e.g., software utilized to order office supplies from the service provider who hosts an online electronic catalog).

At operation 2, the IDP computing system 306 attempts to authenticate the user. In some embodiments, the IDP computing system 306 provides an interface through which the user may enter their credentials (e.g., username, password, PIN, etc.). Upon receiving these credentials (e.g., from the web browser 305), the IDP computing system 306 performs any suitable operations to authenticate the user against previously stored information. By way of example, in some embodiments the IDP computing system 306 identifies whether the user credentials provided by the user and/or web browser 305 match those stored in memory. If there is a match, the IDP computing system 306 continues to operation 3. In some embodiments, if the credentials provided do not match the previously stored credentials, the IDP computing system 306 determines the user is not authentic and may transmit an indication of the same to the web browser 305 for display. In some embodiments, if the user is not authenticated, the protocol 300 may end. Alternatively, the user may have been previously authenticated, and if the IDP computing system 106 recognizes the previous authentication (e.g., via a cookie and/or cryptographic token presented by the user's web browser 105 and/or device 104) the method progresses to operation 5.

At operation 3, the identity provider computing system 306 generates a SAML response (e.g., SAML response data 312) and includes the SAML response in a http_post message 314. The http_post message 314 is then transmitted in response to the http_get message 310. It should be appreciated that http_post message 314 does not include relay state data.

At operation 4, in response to receiving http_post message 314, the web browser 305 (e.g., a web browser of the user device 304) generates a single sign-on request message. In some embodiments, the single sign-on request message is in the form of a http_post message (e.g., http_post message 316). The web browser 305 transmits that message to the service provider computing system 308. The intermediate endpoint 318 is configured to intercept the http_post message 316. In some embodiments, the http_post message 316 is routed to the intermediate endpoint 318 by the service provider computing system 308 based at least in part on determining that the http_post message 316 does not include relay state data. In some embodiments, intermediate endpoint 318 is a component of the service provider computing system 308 as depicted. Additionally or alternatively, intermediate endpoint 318 may be a service, component, and/or module (e.g., software and/or hardware module) that is separate and distinct from the service provider computing system 308. In some embodiments, http_post message 316 includes the SAML response data 312 generated by the IDP computing system 306. In some embodiments, SAML response data 312 may include an identifier for the IDP. In some embodiments, the identifier may be in the form of a URL.

At operation 5, the intermediate endpoint 318 obtains the identifier for the IDP from the SAML response data 312 and/or the http_post message 316. Intermediate endpoint 318 stores any suitable number of artificial relay states for any suitable number of IDPs. Using the identifier, the intermediate endpoint 318 retrieves the artificial relay state 322 specific to the IDP. The artificial relay state 322 may be the same or similar in format as the relay state data discussed above in connection with FIG. 1 but the artificial relay state 322 may be provided by the intermediate endpoint 318 whereas relay state data of FIG. 1 is provided by the authentication endpoint 130. Once retrieved, the artificial relay state 322 is included in http_post message 320 generated by the intermediate endpoint 318 in response to receiving the http_post message 316. The intermediate endpoint 318 includes the SAML response data 312 in the http_post message 320 and transmits the message back to the user device 304. It should be appreciated that the artificial relay state may, in some embodiments, be a default artificial relay state that is common among two or more IDPs. In some embodiments, multiple artificial relay states may be utilized. For example, multiple artificial relay states may exist that correspond to multiple domains. By way of example, one artificial relay state can be used for websites within a particular country.

At operation 6, the user device 304 (e.g., the web browser operating at the user device 304) generates http_post message 324. The user device 304 includes SAML response data 312 and artificial relay state 322 in the http_post message 324 and transmits the message to the authentication endpoint 326 (e.g., an example of the authentication endpoint 130 of FIG. 1).

At operation 7, the authentication endpoint 326 obtains an identifier from the artificial relay state to identify a configuration with which the SAML response data 312 may be parsed. Once parsed, the SAML response data 312 is utilized to verify that the user was authenticated. By way of example, the authentication endpoint 326 identifies that an indicator within the SAML response data 312 indicates the user has been authenticated. If the user was authenticated, the service provider computing system 108 utilizes one or more parameters of the artificial relay state 322 (e.g., openid.return_to) to identify a URL (e.g., a landing page) to which the user is to be redirected.

At operation 8, the service provider computing system 108 sends an http_redirect message 328 to redirect the web browser of the user device 304 to the URL retrieved from the artificial relay state 322. In this manner, the user gains access to the services provided by the service provider via a SSO initiated at the IDP.

Figure 4:
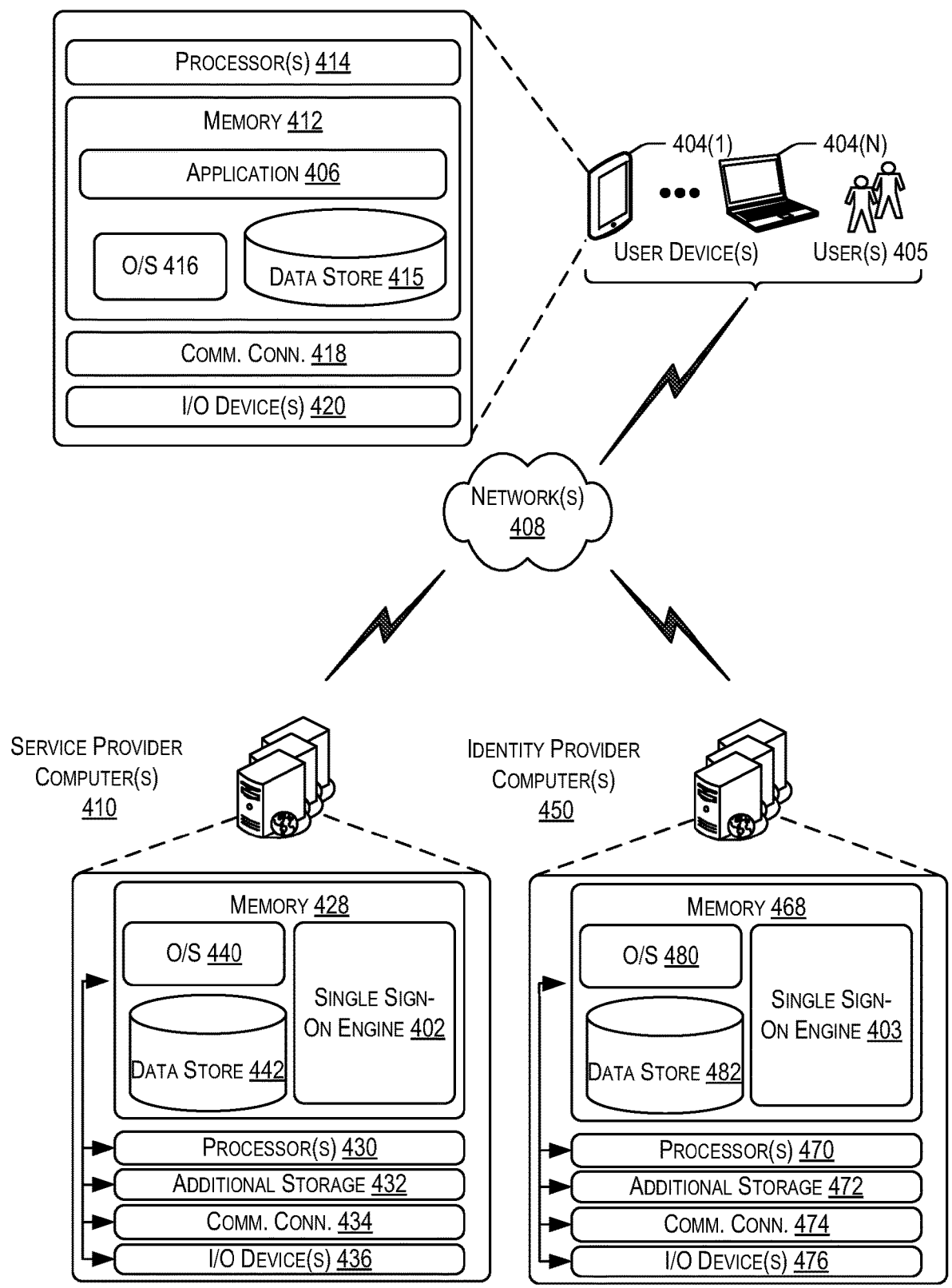
FIG. 4 illustrates example components of a system that includes the single sign-on engine, in accordance with at least one embodiment.

FIG. 4 illustrates components of a system 400 including a single sign-on engine (e.g., single sign-on engine 402, single sign-on engine 403) according to a particular embodiment. In system 400, one or more user(s) 403 may utilize a user device (e.g., a user device of a collection of user device(s) 404, each an example of the user device 104 and 304 of FIGS. 1 and 3, respectively) to provide input to the service provider computer(s) 410 (e.g., an example of the service provider computing system 108 and 308 of FIGS. 1 and 3, respectively). For example, the user may access any suitable input/output devices (e.g., I/O devices 420 discussed below) such as a keyboard, a microphone, and the like, to provide input (e.g., via an application 406 running on the user device(s) 404) to service provider computer(s) 410 via one or more network(s) 408. In some aspects, the application 406 operating on the user device(s) 404 may be a web browser and/or hosted, managed, and/or provided by a computing service or service provider, such as by utilizing one or more service provider computer(s) 410.

In some examples, the network(s) 408 may include any one or a combination of many different types of networks, such as cable networks, the Internet, wireless networks, cellular networks, and other private and/or public networks. While the illustrated example represents the user(s) 403 accessing application functionality over the network(s) 408, the described techniques may equally apply in instances where the user(s) 403 interact with the service provider computer(s) 410 via the one or more user device(s) 404 over a landline phone, via a kiosk, or in any other suitable manner. It should be appreciated that the described techniques may apply in other client/server arrangements, as well as in non-client/server arrangements (e.g., locally stored applications, etc.). Additionally, in some embodiments, the single sign-on engine 402, discussed further below in more detail, may operate in whole or in part on the user device(s) 404. Thus, in some embodiments, the user(s) 403 may access the functionality of the single sign-on engine 402 directly through the user device(s) 404. In some embodiments, the functionality of the single sign-on engine 402 may be provided as a software service with which input (e.g., user credentials) may be submitted and the user may be authenticated and provided access to one or more electronic services. In some embodiments, protocols 100 and 300 of FIGS. 1 and 3, respectively may utilize the network(s) 408 for transmitting and receiving the messages of protocols 100 and 300.

In some embodiments, the application 406 may allow the user(s) 403 to interact with the service provider computer(s) 410 so as to provide the various functionality described above with respect to the single sign-on engine 402. For example, the application 406 may be utilized to provide user input to the service provider computer(s) 410 and/or to the identity provider computer(s) 450. The application 406 may be configured to transmit (electronically convey) the user's input(s) to the single sign-on engine 402 and/or the single sign-on engine 403. The application 406 may further be configured to receive, process, and/or present any suitable data received from the service provider computer(s) 410 and/or the identity provider computer(s) 450.

The service provider computer(s) 410 and/or identity provider computer(s) 450, the perhaps arranged in a cluster of servers or as a server farm, may individually host the application 406 operating on the user device(s) 404 and/or cloud-based software services. Other server architectures may also be used to host the application 406 and/or cloud-based software services. The application 406 operating on the user device(s) 404 may be capable of handling requests from the user(s) 405 and serving, in response, various user interfaces and/or output that can be presented at the user device(s) 404 (e.g., via a display and/or speaker). The application 406 operating on the user device(s) 404 can present any suitable type of website that supports user interaction, an electronic catalog, search engine sites, item detail pages, and the like. The described techniques can similarly be implemented outside of the application 406, such as with other applications running on the user device(s) 404.

The user device(s) 404 may be any suitable type of computing device such as, but not limited to, a mobile phone, a smart speaker, a hand-held scanner, a touch screen device, a smartphone, a personal digital assistant (PDA), a laptop computer, a desktop computer, a thin-client device, a tablet PC, an electronic book (e-book) reader, etc. In some examples, the user device(s) 404 may be in communication with the service provider computer(s) 410 and/or the identity provider computer(s) 450 via the network(s) 408, or via other network connections.

In one illustrative configuration, the user device(s) 404 may include at least one memory 412 and one or more processing units (or processor(s)) 414. The processor(s) 414 may be implemented as appropriate in hardware, computer-executable instructions, firmware, or combinations thereof. Computer-executable instruction or firmware implementations of the processor(s) 414 may include computer-executable or machine-executable instructions written in any suitable programming language to perform the various functions described.

The memory 412 may store program instructions that are loadable and executable on the processor(s) 414, as well as data generated during the execution of these programs. Depending on the configuration and type of user computing device, the memory 412 may be volatile (such as random access memory (RAM)) and/or non-volatile (such as read-only memory (ROM), flash memory, etc.). The user device(s) 404 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 412 may include multiple different types of memory, such as static random access memory (SRAM), dynamic random access memory (DRAM), or ROM.

Turning to the contents of the memory 412 in more detail, the memory 412 may include an operating system 416, one or more data stores 415, and one or more application programs, modules, or services for implementing the features of the single sign-on engine 402 disclosed herein, provided via the application 406 (e.g., a browser application, a shopping application, a digital assistant application, etc.). The application 406 may be configured to receive, store, and/or display a network page or other interface for interacting with the service provider computer(s) 410. In some embodiments, the application 406 may be configured to present user options and/or receive user input audibly. In some embodiments, the memory 412 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 404 may also contain communications connection(s) 418 that allow the user device(s) 404 to communicate with a stored database, another computing device or server (e.g., the service provider computer(s) 410), user terminals and/or other devices on the network(s) 408. The user device(s) 404 may also include I/O device(s) 420, such as a keyboard, a mouse, a pen, a voice input device (e.g., a microphone), a touch input device, a display, speakers, a printer, etc.

In some aspects, the service provider computer(s) 410 and/or the identity provider computer(s) 450 may also be any suitable type of computing devices such as, but not limited to, a mobile phone, a smart speaker, smart phone, a personal digital assistant (PDA), a laptop computer, a desktop computer, a server computer, a thin-client device, a tablet PC, etc. Additionally, it should be noted that in some embodiments, the service provider computer(s) 410 and/or the identity provider computer(s) 450 are executed by one or more virtual machines implemented in a hosted computing environment. The hosted computing environment may include one or more rapidly provisioned and released computing services, which computing services may include computing, networking and/or storage devices. A hosted computing environment may also be referred to as a cloud-computing environment. In some examples, the service provider computer(s) 410 and/or the identity provider computer(s) 450 may be in communication with the user device(s) 404 and/or other service providers via the network(s) 408 or via other network connections. The service provider computer(s) 410 and/or the identity provider computer(s) 450 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 410 and/or the identity provider computer(s) 450 may include at least one memory 428 or 468 and one or more processing units (or processor(s)) 430 or 470, respectively. The processor(s) 430 and/or 470 may be implemented as appropriate in hardware, computer-executable instructions, firmware, or combinations thereof. Computer-executable instruction or firmware implementations of the processor(s) 430 and/or 470 may include computer-executable or machine-executable instructions written in any suitable programming language to perform the various functions described.

The memory 428 and/or 468 may store program instructions that are loadable and executable on the processor(s) 430 and/or 470, as well as data generated during the execution of these programs. Depending on the configuration and type of service provider computer(s) 410 and/or the identity provider computer(s) 450, the memory 428 and/or 468 may be volatile (such as RAM) and/or non-volatile (such as ROM, flash memory, etc.). The service provider computer(s) 410 and/or the identity provider computer(s) 450 or servers may also include additional storage 432 or 472, which may include removable storage and/or non-removable storage. The additional storage 432 and/or 472 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 428 and/or 468 may include multiple different types of memory, such as SRAM, DRAM, or ROM.

The memory 428 and/or 468, the additional storage 432 and/or 472, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 428 and/or 468 and the additional storage 432 and/or 472 are all examples of computer storage media. Additional types of computer storage media that may be present in the service provider computer(s) 410 and/or the identity provider computer(s) 450 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 410 and/or the identity provider computer(s) 450. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 410 may also contain communications connection(s) 434 that allow the service provider computer(s) 410 to communicate with a stored database, another computing device or server, user terminals and/or other devices on the network(s) 408. The identity provider computer(s) 450 may also contain communications connection(s) 474 that allow the identity provider computer(s) 450 to communicate with a stored database, another computing device or server, user terminals and/or other devices on the network(s) 408. The service provider computer(s) 410 and/or the identity provider computer(s) 450 may also include I/O device(s) 436 and/or 476, respectively, such as a keyboard, a mouse, a pen, a voice input device, a touch input device, a display, speakers, a printer, etc.

Turning to the contents of the memory 428 and/or 468 in more detail, the memory 428 may include an operating system 440 and/or 480, one or more data stores 442 and/or 482, and/or one or more application programs, modules, or services for implementing the features disclosed herein, such as the features provided by the single sign-on engine 402 and/or single sign-on engine 403.

Figure 5:
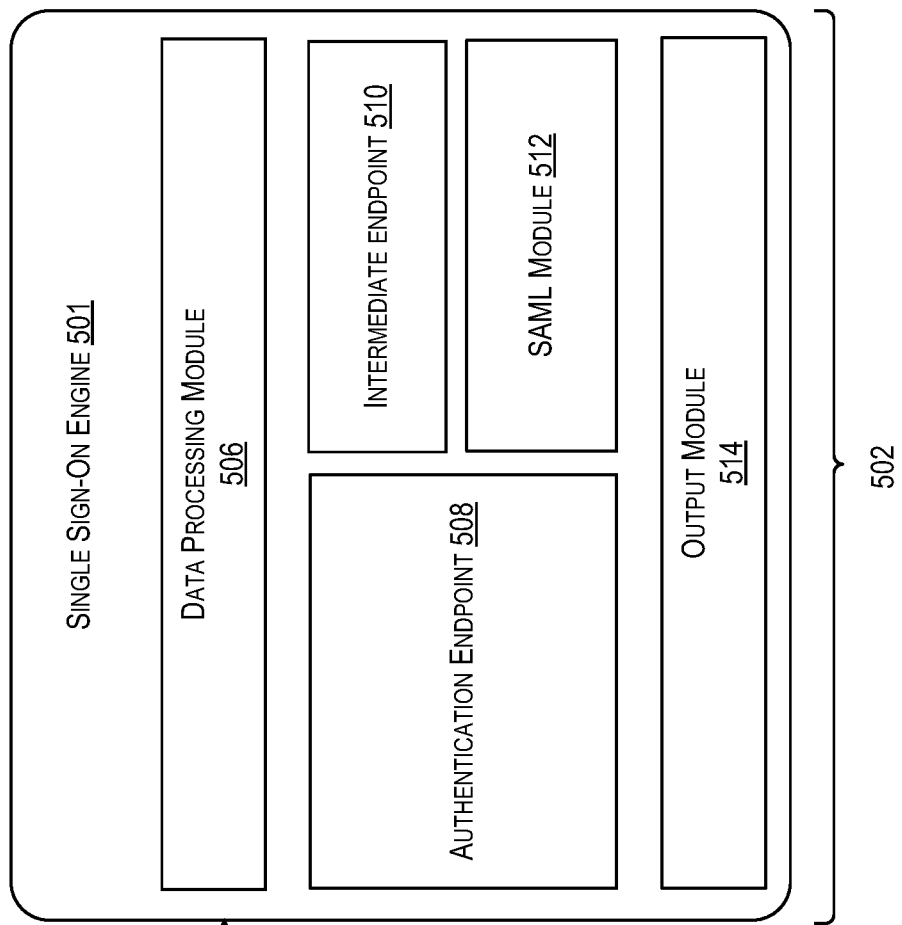
FIG. 5 is a schematic diagram of an example computer architecture for the single sign-on engine, including a plurality of modules that may perform functions in accordance with at least one embodiment.
Figure 5:
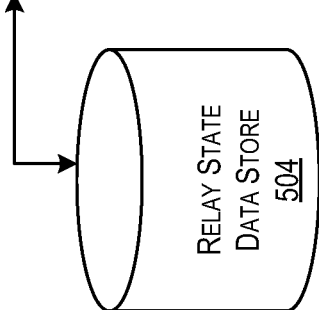

FIG. 5 is a schematic diagram of an example computer architecture 500 for the single sign-on engine 501 (e.g., an example of the single sign-on engines 402 and/or 403 of FIG. 4), including a plurality of modules 502 that may perform functions in accordance with at least one embodiment. The modules 502 may be software modules, hardware modules, or a combination thereof. If the modules 502 are software modules, the modules 502 can be embodied on a computer readable medium and processed by a processor in any of the computer systems described herein. It should be noted that any module or data store described herein, may be, in some embodiments, be a service responsible for managing data of the type required to make corresponding calculations. The modules 502, or some portion of the modules 502, may be operate at the service provider computer(s) 410 and/or the identify provider computer(s) 450 of FIG. 4, or the modules may operate as separate modules or services external to the service provider computer(s) 410 and/or the identity provider computer(s) 450 (e.g., as part of the application 406 of FIG. 4 operating on the user device(s) 404 of FIG. 4).

In the embodiment shown in the FIG. 5 a relay state data store 504 is shown, although data can be maintained, derived, or otherwise accessed from various data stores, either remote or local to the single sign-on engine 501, to achieve the functions described herein. In at least one embodiment, the data stores described herein may be physically located on the service provider computer(s) 410 and/or the identity provider computer(s) 450 or alternatively, any suitable combination of the data stores may be accessible to the service provider computer(s) 410 and/or the identity provider computer(s) 450. The single sign-on engine 501, as shown in FIG. 5, includes various modules such as a data processing module 506, an authentication endpoint 508, an intermediate endpoint 510, a SAML module 512, and an output module 514 are shown. Some functions of the modules 502 are described below. However, for the benefit of the reader, a brief, non-limiting description of each of the modules is provided in the following paragraphs.

In at least one embodiment, the single sign-on engine 501 includes the data processing module 506. Generally, the data processing module 506 may be utilized to receive any suitable information with respect to any example provided herein. The data processing module 506 may include any suitable number of application programming interfaces with which the functionality of the single sign-on engine 501 may be invoked. In some embodiments, the data processing module 506 may be configured to receive any suitable number of instances of relay state data corresponding to any suitable number of identity providers. The data processing module 506 may be configured to store this relay state data in relay state data store 504 for subsequent use. In some embodiments relay state data may be indexed or otherwise retrievable using an identifier (e.g., an alphanumeric identifier associated with an identity provider). Example relay state data is provided above in connection with the description of FIG. 1.

The single sign-on engine 501 may include an authentication endpoint 508 (e.g., an example of the authentication endpoint 130 of FIG. 1 and/or the authentication endpoint 326 of FIG. 3). The authentication endpoint 130 may be configured to execute any suitable operations such as those discussed in connection with authentication endpoints 130 and 326. By way of example, the authentication endpoint may be configured to execute any suitable API and/or function call to invoke the functionality of the SAML module 512. The SAML module 512 may be configured to generate SAML requests and/or process SAML responses based at least in part on any suitable Security Assertion Markup Language standard. The authentication endpoint 508 may be configured to retrieve any suitable relay state data associated with a given identity provider. The authentication endpoint 508 may be configured to generate http_get messages in which a SAML request and relay state data associated with an identity provider may be embedded. The authentication endpoint 508 may be configured to transmit such messages to a requesting user device (e.g., a user device from which a corresponding http_get message has previously been received). In some embodiments, the authentication endpoint 508 may be configured to retrieve a parameter from relay state data received to identify a redirect URL and may transmit a http_redirect message containing that URL to a requesting user device. In some embodiments, the authentication endpoint 508 may be configured to receive http_get messages and/or http_post messages from a user device 304. The authentication endpoint 508 may further be configured to identify, from SAML data received, that a user has been authenticated (or not).

The single sign-on engine 501 may include an intermediate endpoint 510 (e.g., an example of the intermediate endpoint 318 of FIG. 3. The intermediate endpoint 318 may be configured to receive http_post messages from a user device (e.g., the user device 304 of FIG. 3). The intermediate endpoint 318 may be configured to retrieve an identifier associated with an identity provider from a receive SAML response (e.g., the SAML response data 312 of FIG. 3). Using the identifier, the intermediate endpoint 318 may retrieve a corresponding artificial relay state from the relay state data store 504. Relay state data and artificial relay states may include similar information but "relay state data"

may be used to refer to a relay state provided by the authentication endpoint 508 and an "artificial relay state" may be used to refer to a relay state provided by the intermediate endpoint 510. In some embodiments, the intermediate endpoint 510 may be configured to execute any suitable API and/or function call to invoke the functionality of the SAML module 512. The SAML module 512 may be configured to process SAML responses based at least in part on any suitable Security Assertion Markup Language standard. The intermediate endpoint 510 may be configured to retrieve any suitable relay state data associated with a given identity provider. The intermediate endpoint 510 may be configured to generate http_post messages in which a SAML response and an artificial relay state (e.g., the retrieved relay state data associated with an identity provider) may be embedded. The intermediate endpoint 510 may be configured to transmit such messages to a requesting user device (e.g., a user device from which a corresponding http_post message has previously been received).

Figure 6:
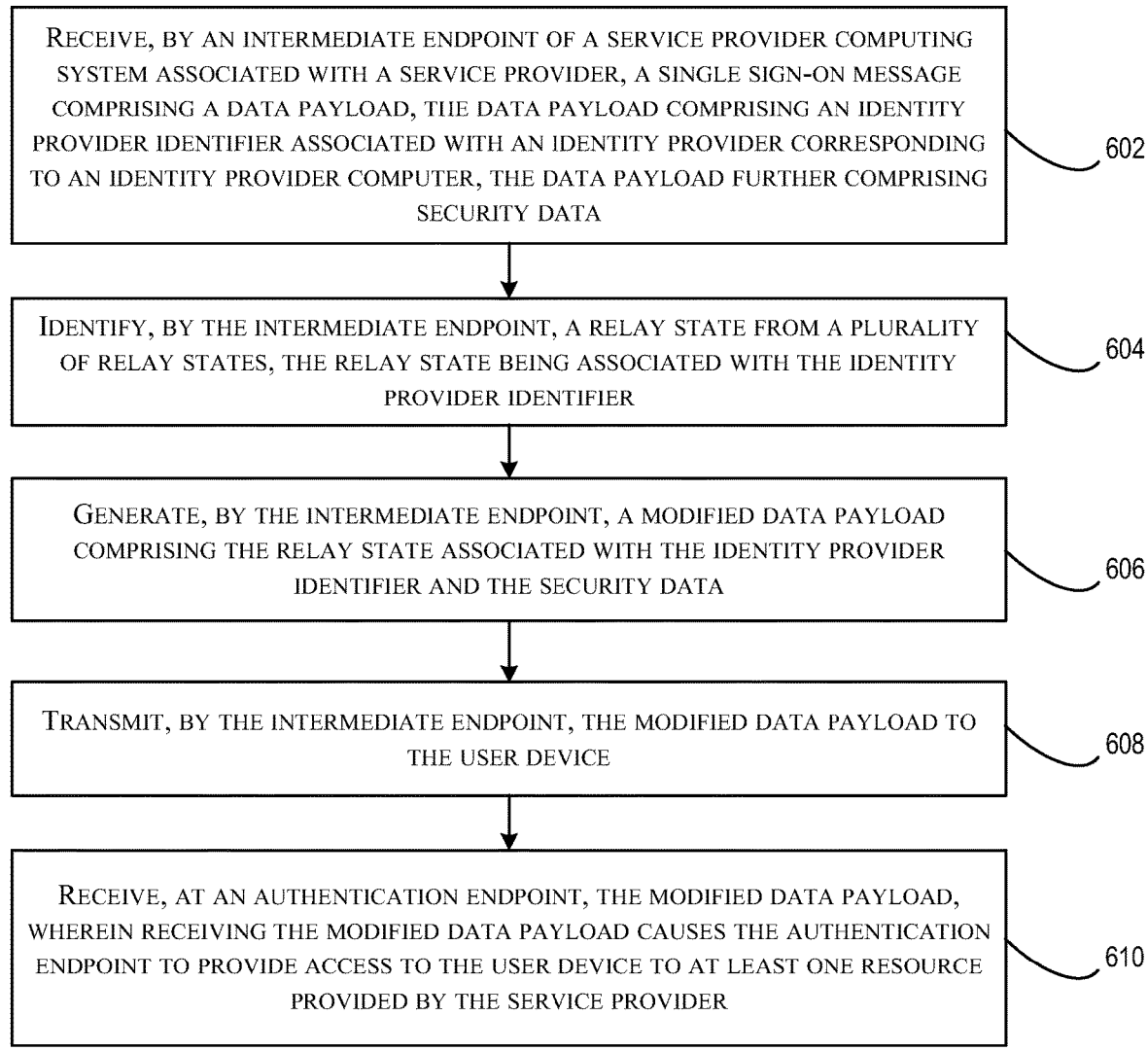
FIG. 6 includes a flowchart illustrating an example method for providing a single sign-on capability, in accordance with at least one embodiment.

FIG. 6 includes a flowchart illustrating an example method 600 for providing a single sign-on capability, in accordance with at least one embodiment. It should be appreciated that the operations of the method 600 may be performed in any suitable, not necessarily the order depicted in FIG. 6. Further, the method 600 may include additional, or fewer operations than those depicted in FIG. 6. The operations of method 600 may be performed by a computing system (e.g., the system 400 of FIG. 4) comprising the single sign-on engine 501 of FIG. 5 which may operate in whole or in part on a user device (e.g., one or more of the user device(s) 404 of FIG. 4) and/or the service provider computer(s) 410 of FIG. 4.

The method 600 begins at 602, a single sign-on message comprising a data payload may be received (e.g., from a user device by a service provider computing system associated with a service provider, by the intermediate endpoint 510 of FIG. 5) from a user device (e.g., user device 104 of FIG. 1). In some embodiments, the data payload may include an identity provider identifier and security data (e.g., SAML response data).

At 604, the intermediate endpoint (e.g., by the intermediate endpoint 510) determines the single sign-on message lacks a relay state. In some embodiments, the intermediate endpoint checks the single sign-on message for one or more data fields associated with relay state data. If those one or more data fields are not present, the intermediate endpoint determines the messages lack a relay state.

At 606, the intermediate endpoint (e.g., the intermediate endpoint 510) generates a modified data payload comprising the security data received in the single sign-on message and relay state data associated with the identity provider identifier and the security data At 608, the intermediate endpoint transmits the modified data payload to the user device.

At 610, the modified data payload is received (e.g., at the authentication endpoint 508 of FIG. 5). In some embodiments, receiving the modified data payload causes the authentication endpoint to provide access to the user device to at least one resource provided by the service provider.

Figure 7:
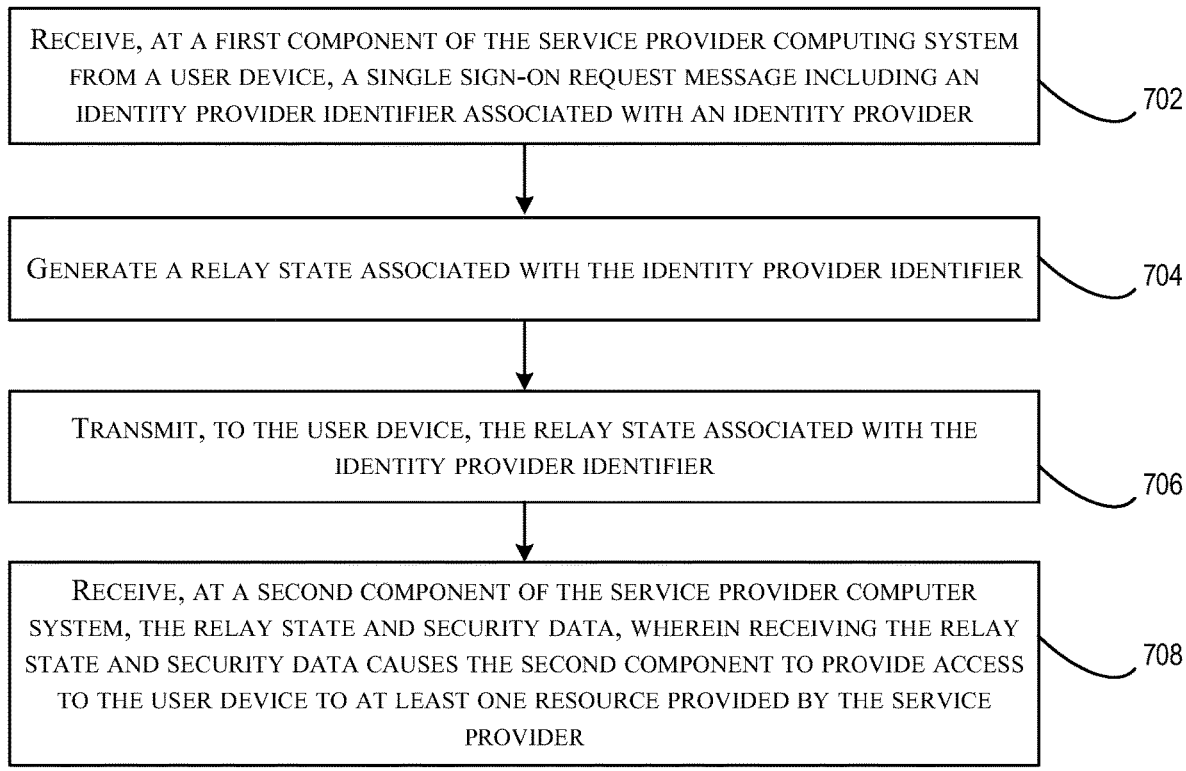
FIG. 7 includes another flowchart illustrating another example method for providing a single sign-on capability, in accordance with at least one embodiment.

FIG. 7 includes another flowchart illustrating another example method 700 for providing a single sign-on capability, in accordance with at least one embodiment. Method 700 may be performed by a service provider computing system (e.g., the service provider computer(s) 410 of FIG. 4).

The method 700 begins at 702, where a single sign-on request message including an identity provider identifier associated with an identity provider is received. In some embodiments, the single sign-on request is received from a user device, at a first component of the service provider computing system (e.g., the intermediate endpoint 510 of FIG. 5).

At 704, a relay state associated with the identity provider identifier is generated (e.g., by the intermediate endpoint 510). In some embodiments, the relay state data is generated (e.g., copied) from previously stored relay state data. In other embodiments, the intermediate endpoint 510 retrieves a configuration of a relay state based at least in part on a configuration associated with the identity provider. This configuration could be retrieved using the identity provider identifier.

At 706, the relay state associated with the identity provider identifier is transmitted to the user device (e.g., by the intermediate endpoint 510).

At 708, the relay state and security data are received (e.g., from the user device by a second component such as the authentication endpoint 508 of the service provider computing system). In some embodiments, receiving the relay state and security data causes the second component to provide access to the user device to at least one resource provided by the service provider.

Figure 8:
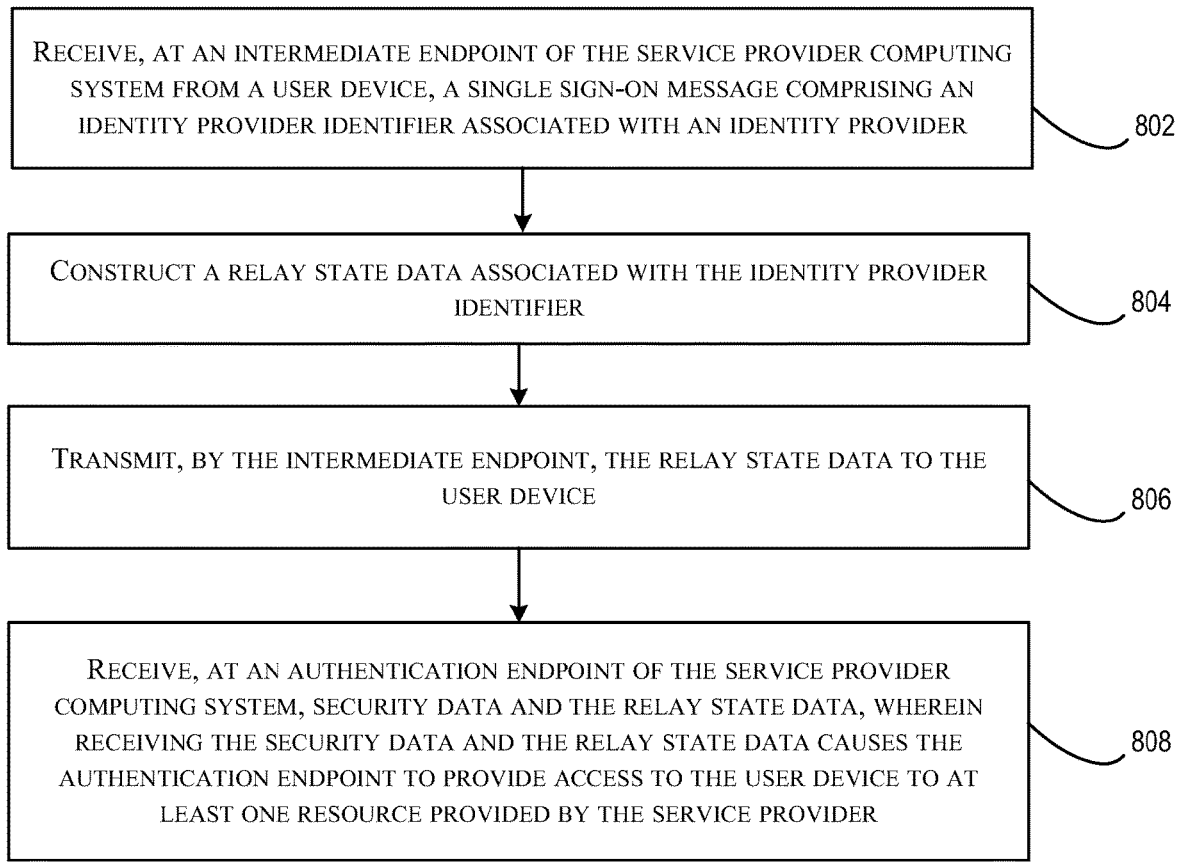
FIG. 8 includes yet another flowchart illustrating yet another example method for providing a single sign-on capability, in accordance with at least one embodiment.

FIG. 8 includes yet another flowchart illustrating yet another example method 800 for providing a single sign-on capability, in accordance with at least one embodiment. One or more computer-readable storage media having collectively stored thereon computer-executable instructions that, when executed with one or more processors of a service provider computing system, collectively causes the service provider computing system to perform the method 800.

Method 800 begins at 802, where a single sign-on message comprising an identity provider identifier associated with an identity provider is received. In some embodiments, the single sign-on message is received from a user device at an intermediate endpoint of the service provider computing system (e.g., the intermediate endpoint 510 of FIG. 5) or another component of the service provider computing system, or an intermediate endpoint that is separate and distinct from the service provider computing system.

At 804, a relay state data associated with the identity provider identifier is constructed (e.g., by the intermediate endpoint 510). By way of example, the intermediate endpoint 510 (or another component of the service provider computing system, or an intermediate endpoint that is separate and distinct from the service provider computing system) retrieves a configuration or sample relay state associated with the identity provider identifier. In some embodiments, the intermediate endpoint 510 utilizes the configuration/sample relay state to construct the relay state data.

At 806, the relay state data is transmitted to the user device (e.g., by the intermediate endpoint 510).

At 808, security data (e.g., SAML response data) and the relay state data are received by the service provider computing system. In some embodiments, the security data and the relay state data are received at an authentication endpoint of the service provider computing system (e.g., the authentication endpoint 508 of FIG. 5). In some embodiments, receiving the security data and the relay state data causes the authentication endpoint to provide access to the user device to at least one resource provided by the service provider.

It should be appreciated that different environments may be used, as appropriate, to implement various embodiments. The user devices discussed herein can include any appropriate device operable to send and receive requests, messages, or information over an appropriate network and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server for receiving requests and serving content in response thereto, although for other networks an alternative device serving a similar purpose could be used as would be apparent to one of ordinary skill in the art.

Some environments include at least one application server and a data store. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between a user device and an application server can be handled by the Web server. It should be understood that the Web and application servers are not required and are merely example components, as structured code discussed herein can be executed on any appropriate device or host machine as discussed elsewhere herein.

A data store can include several separate data tables, databases or other data storage mechanisms and media for storing data relating to a particular aspect. A data store can also include a mechanism for storing log data, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store. The data store may be operable, through logic associated therewith, to receive instructions from an application server and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on a user device. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than those illustrated herein. Thus, the environments of FIGS. 1-4 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, from a user device by an intermediate endpoint of a service provider computing system associated with a service provider, a single sign-on message comprising a data payload, the data payload comprising an identity provider identifier associated with an identity provider corresponding to an identity provider computer, the data payload further comprising security data;
determining that the single sign-on message lacks a relay state;
generating, by the intermediate endpoint, a modified data payload, the modified data payload comprising the security data and relay state data associated with the identity provider identifier;
transmitting, by the intermediate endpoint, the modified data payload to the user device; and
receiving, at an authentication endpoint of the service provider computing system, the modified data payload, wherein receiving the modified data payload causes the authentication endpoint to provide access to the user device to at least one resource provided by the service provider.

2. The computer-implemented method of claim 1, wherein the relay state comprises the identity provider identifier and one or more of: a uniform resource locator, a language identifier, and/or one or more session states.

3. The computer-implemented method of claim 2, wherein the single sign-on message is formatted as an http_post message.

4. The computer-implemented method of claim 1, wherein the security data comprises Security Assertion Markup Language (SAML) response data.

5. The computer-implemented method of claim 4, wherein the SAML response data is generated by the identity provider computer.

6. A service provider computing system associated with a service provider, the service provider computing system comprising:
one or more processors; and
one or more memories storing executable instructions that, when executed with the one or more processors, cause the service provider computing system to, at least:
receive, from a user device, a single sign-on request message including an identity provider identifier associated with an identity provider;
generate relay state data associated with the identity provider identifier;
transmit, to the user device, the relay state data associated with the identity provider identifier; and
receive, by the service provider computing system from the user device, the relay state data and security data, wherein receiving the relay state data and the security data causes the service provider computing system to provide access to the user device to at least one resource provided by the service provider.

7. The service provider computing system of claim 6, wherein the single sign-on request message is received by a first component of the service provider computing system, and wherein the first component is an intermediate endpoint associated with the service provider.

8. The service provider computing system of claim 6, wherein the relay state data and the security data is received from the user device by a second component of the service provider computing system, and wherein the second component is an authentication endpoint associated with the service provider.

9. The service provider computing system of claim 6, wherein the single sign-on request message further comprises the security data, the security data being generated by an identity provider computer associated with the identity provider.

10. The service provider computing system of claim 6, wherein the relay state data and the security data are transmitted in an http_post message to the user device.

11. The service provider computing system of claim 6, wherein the security data is formatted according to a Security Assertion Markup Language.

12. The service provider computing system of claim 6, wherein the service provider computing system stores a plurality of relays states corresponding to a plurality of identity providers, and wherein the relay state data associated with the identity provider is retrieved from the plurality of relay states based at least in part on the identity provider identifier.

13. One or more computer-readable storage media having collectively stored thereon computer-executable instructions that, when executed with one or more processors of a service provider computing system, collectively causes the service provider computing system to perform operations comprising:
receiving, from a user device, a single sign-on message comprising an identity provider identifier associated with an identity provider;
constructing relay state data associated with the identity provider identifier;
transmitting the relay state data to the user device; and
receiving, from the user device, a second message comprising security data and the relay state data, wherein receiving the security data and the relay state data causes the service provider computing system to provide access to the user device to at least one resource provided by a service provider associated with the service provider computing system.

14. The one or more computer-readable storage media of claim 13, wherein providing the access to the user device comprises transmitting a redirect message comprising a uniform resource locator obtained from the relay state data.

15. The one or more computer-readable storage media of claim 13, wherein the single sign-on message comprises the security data, the security data comprising Security Assertion Markup Language (SAML) response data initially generated by an identity provider computer, wherein the single sign-on message lacks the relay state data.

16. The one or more computer-readable storage media of claim 13, wherein transmitting, the security data and the relay state data to the user device causes the user device to transmit, to the service provider computing system, an http_post message comprising the security data and the relay state data.

17. The one or more computer-readable storage media of claim 13, wherein the service provider computing system is further configured to verify, via the security data, that a user has been authenticated by the identity provider.

18. The one or more computer-readable storage media of claim 13, wherein the single sign-on message is received at an intermediate endpoint and the second message is received at an authentication endpoint of the service provider computing system.

19. The one or more computer-readable storage media of claim 13, wherein the service provider computing system performs further operations comprising transmitting, to the user device, a uniform resource locator obtained from the relay state data, the uniform resource locator being transmitted in an http_redirect message.

20. The one or more computer-readable storage media of claim 13, wherein the service provider computing system denies access to the user device when the second message lacks a corresponding relay state.

\* \* \* \* \*